United States Patent
Kleila et al.

(10) Patent No.: US 6,436,003 B1
(45) Date of Patent: Aug. 20, 2002

(54) PROCESS FOR CONTROLLING A CVT INSTALLED IN THE POWER TRAIN OF A MOTOR VEHICLE

(75) Inventors: Hans Kleila, Russelsheim; Gernot Becker, Dexheim, both of (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/633,385

(22) Filed: Aug. 7, 2000

(30) Foreign Application Priority Data

Aug. 24, 1999 (DE) .......................... 199 40 085

(51) Int. Cl.$^7$ ............................................. B60K 41/12
(52) U.S. Cl. ...................................................... 477/43
(58) Field of Search .......................... 477/43, 44, 46, 477/120, 121, 125

(56) References Cited

U.S. PATENT DOCUMENTS

| | | | |
|---|---|---|---|
| 4,612,827 A | * 9/1986 | Omitsu | 477/43 |
| 4,653,005 A | * 3/1987 | Osanai et al. | 477/43 X |
| 4,656,587 A | * 4/1987 | Osanai et al. | 477/43 X |
| 4,683,779 A | * 8/1987 | Osanai et al. | 477/43 |
| 4,704,683 A | * 11/1987 | Osanai | 477/43 X |
| 4,715,258 A | * 12/1987 | Shigematsu et al. | 477/43 |
| 4,735,112 A | * 4/1988 | Osanai et al. | 477/43 |
| 4,836,056 A | * 6/1989 | Nakawaki et al. | 74/866 |
| 4,964,318 A | * 10/1990 | Ganoung | 477/110 |
| 5,047,937 A | * 9/1991 | Vahabzadeh et al. | 477/43 X |
| 5,079,705 A | * 1/1992 | Sakai et al. | 74/866 X |
| 5,191,814 A | * 3/1993 | Ando et al. | 74/866 |
| 5,247,859 A | * 9/1993 | Agusa et al. | 74/866 |
| 5,413,540 A | * 5/1995 | Streib et al. | 477/43 |
| 5,919,244 A | * 7/1999 | Danz et al. | 477/138 X |
| 6,052,639 A | * 4/2000 | Ashizawa et al. | 477/43 X |
| 6,066,070 A | * 5/2000 | Ito et al. | 477/43 |
| 6,181,020 B1 | * 1/2001 | Uchida et al. | 477/43 X |

FOREIGN PATENT DOCUMENTS

| | | | |
|---|---|---|---|
| DE | 43 37 957 A1 | 5/1994 | |
| DE | 44 19 753 A1 | 4/1995 | |
| DE | 197 06 545 A1 | 8/1997 | |
| DE | 196 50 218 A1 | 6/1998 | |
| DE | 198 28 603 A1 | 2/1999 | |
| DE | 197 42 604 A1 | 4/1999 | |
| DE | 198 02 075 A1 | 7/1999 | |
| JP | 360081559 | * 5/1985 | 477/43 |
| JP | 363170134 | * 7/1988 | 477/43 |

* cited by examiner

*Primary Examiner*—Charles A Marmor
*Assistant Examiner*—Roger Pang
(74) *Attorney, Agent, or Firm*—Leslie C. Hodges

(57) ABSTRACT

The invention concerns a process for controlling a CVT in a motor vehicle. In order to avoid an uncomfortable excitation of a transmission ratio change of the CVT when the driving speed is constant it is proposed that in the case of small accelerator pedal changes (<a) and in the case of changes in driving speed (S) occurring within a calibrated range (S1<S<S2) the transmission ratio of the CVT be held constant.

3 Claims, 1 Drawing Sheet

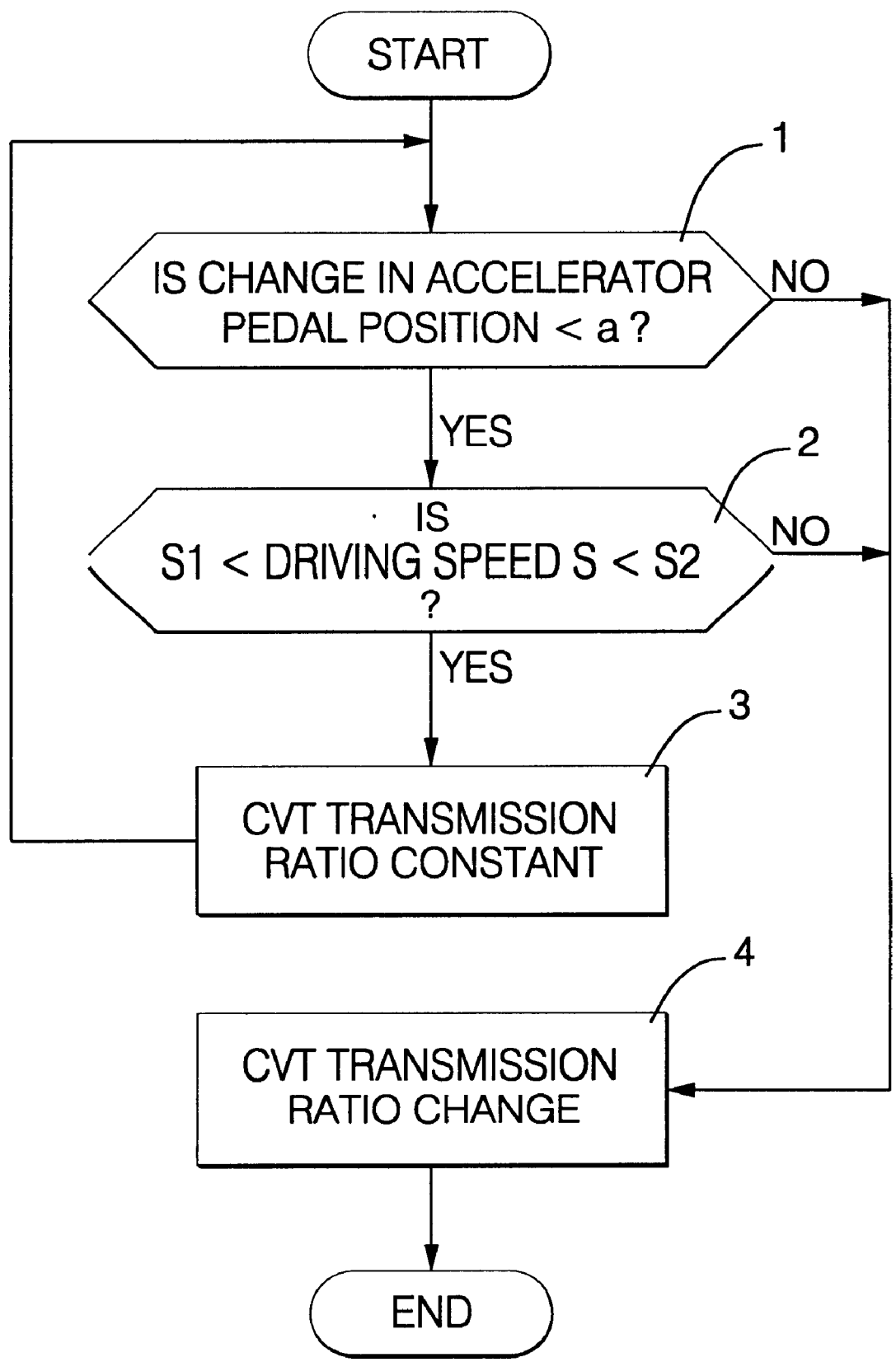

PROCESS FOR CONTROLLING A CVT INSTALLED IN THE POWER TRAIN OF A MOTOR VEHICLE

TECHNICAL FIELD

The invention concerns a process for controlling a continuously variable transmission (CVT) installed in the power train of a motor vehicle between a drive engine and a drive axle.

BACKGROUND OF THE INVENTION

In a CVT, i.e. a continuously variable automatic transmission, depending on the driver's desire regarding the vehicle's operating behavior, a consumption-optimized or driving performance-optimized control curve in an engine characteristic field is selected by means of a selector switch or automatically. In this context, however, the disadvantage arises that as a result of the typical adjustment characteristic of the CVT, i.e. the constant engine rpm during acceleration, the driving behavior is perceived by the driver as not corresponding to his wishes especially as a result of the acoustic feedback. The fixed control of the CVT may also fail to take into account the varying factors and driving conditions such as slopes, gradients, head wind, a pulled load, etc.

In order to counteract this shortcoming, DE 197 42 604 A1 proposes that preferably the nominal rpm of the drive engine be determined as a response to a change in the position of the accelerator pedal as a function of a responder function with a jump component, in which case the responder function varies over a time which passes since the change in the position of the accelerator pedal.

In this way, during an acceleration process, an acoustic feedback acceptable for the driver can indeed be achieved. However, the operating behavior of the CVT in the case of constant operation of the vehicle is not improved by such a measure, e.g., in the case of driving at a constant speed but during which unevennesses on the road, the effects of wind, variable rolling resistance or similar disturbing factors arise which the driver compensates for or attempts to compensate for by scarcely perceptible and often unconsciously performed changes in the position of the accelerator pedal.

As a result of such disturbing factors, and also due to the resulting usually only slight changes in the position of the accelerator pedal, the CVT reacts by changes in the transmission ratio in order to remain on the preassigned control curve. This results in an unstable driving state in which the engine rpm varies around a mean value while simultaneously the CVT compensates for these fluctuations by changing the transmission ratio. For the driver this state generally causes disturbing sensations.

SUMMARY OF THE INVENTION

The invention has the objective of improving the process for controlling a CVT installed in the drive train of a motor vehicle in such a way that in the case of a constant driving state of the motor vehicle any of the above, described inconveniences which occur are eliminated.

The invention solves this problem by characterized by the following steps:
in the case of a change in the accelerator pedal position it checks whether this change is within a value (a) relevant for the driving behavior or lies above it, in which case only when the values is above it does it intervene in the usual manner in the regulation of the transmission ratio of the CVT in the form of a change in transmission ratio;

if it is found that the change in the accelerator pedal position is below a value (a) relevant for the driving dynamic, it checks whether the driving speed (S) has changed to above a calibrated range around the current driving speed or remains within this calibrated range (S1<S<S2) in which case only upon the recognition of a change in driving speed outside of the calibrated range (S1<S<S2) does it intervene immediately and in the usual way in the regulation of the transmission ratio in the form of a change in the transmission ratio of the CVT;

if it is found that the change in the driving speed remains within the calibrated range (S1<S<S2) it does not intervene in the regulation of the CVT in the form of a transmission ratio change, and the existing transmission ratio remains constant.

Advantages modifications of the invention of the invention are characterized by the fact that the calibrated range (S1<S<S2) varies in magnitude as a function of the actual driving speed (S) and by the fact that the calibrated range (S1<S<S2) becomes greater with increasing driving speed (S).

DESCRIPTION OF THE PREFERRED EMBODIMENT

If during the driving of a motor vehicle with an approximately constant speed a slight increase or reduction in the driving resistance occurs, this change in driving resistance can be compensated by the driver by changing the position of the accelerator pedal and thereby changing the driving force of the engine. As long as this change in the position of the accelerator pedal remains below a preassigned value a (compare box 1) the controller of the CVT does not change the transmission ratio. If the change in the accelerator pedal position exceeds the value a, because only in this way can an approximately constant speed be maintained, then according to box 2 (the controller) checks whether the present driving speed S remains within a fixed speed range from S1 to S2 around S. If this is the case the change in transmission ratio on the CVT is still suppressed and the transmission ratio remains constant (box 3). Only when the change in speed goes beyond the calibrated driving speed range S1<S<S2 is a transmission ratio change initiated on the CVT as illustrated by box 4.

In this way it becomes possible to drive at a constant speed with quiet driving behavior even with a CVT. In this driving phase the driver receives the acoustically perceptible rpm signal of small velocity changes. He can compensate for them in the usual way consciously or unconsciously by changing the position of the accelerator pedal. When the vehicle is equipped with a Tempomat, no disturbing driving states are adjusted in which the CVT constantly has its transmission ratio fluctuate about a central position.

It may be advantageous for the driving behavior of a motor vehicle if the calibrated range of the driving speed S1<S<S2 is variable as a function of the actual driving speed S by having this range be smaller, e.g., in the case of a low actual driving speed than in the case of a higher actual driving speed. In this way the response behavior of a vehicle can be additionally adapted to movements of the accelerator pedal. The variable size of the calibrated range S1<S<S2 as a function of the actual driving speed S can be stored in a memory of the electronic control system of the CVT.

What is claimed is:

1. Process for controlling a CVT (continuously variable transmission) installed in a drive train of a motor vehicle between a drive engine and a drive axle with a driven primary disk and a secondary disk of which at least one is variable in its active diameter and which together are surrounded by a surrounding organ for transmitting a torque, an electronic control device registering and monitoring the rpm signals of the primary disk and secondary disk, and actuators for adjusting the effective diameter of the primary and/or secondary disk and with it the transmission ratio of the CVT as a function of these rpm and of at least the position of an accelerator pedal, characterized by the following steps:

in the case of a change in the accelerator pedal position it checks whether this change is within a value (a) relevant for a driving behavior or lies above it (1), in which case only when the value is above it does it intervene in the regulation of the transmission ratio of the CVT in the form of a change in transmission ratio (4);

if it is found that the change in the accelerator pedal position is below a value (a) relevant for the driving behavior, it checks whether a driving speed (S) has changed to above a calibrated range around the current driving speed or remains within this calibrated range (S1<S<S2) (2) in which case only upon the recognition of a change in driving speed outside of the calibrated range (S1<S<S2) does it intervene immediately in the regulation of the transmission ratio in the form to a change in the transmission ratio (4) of the CVT;

if it is found that the change in the driving speed remains within the calibrated range (S1<S<S2) it does not intervene in the regulation of the CVT in the form of a transmission ratio change, and the existing transmission ratio remains constant (3).

2. Process as in claim 1, characterized by the fact that the calibrated range (S1<S<S2) varies in magnitude as a function of the actual driving speed (S).

3. Process as in claim 2, characterized by the fact that the calibrated range (S1<S<S2) becomes greater with increasing driving speed (S).

* * * * *